(12) United States Patent
Sangaru

(10) Patent No.: US 12,350,623 B1
(45) Date of Patent: Jul. 8, 2025

(54) CARBON DIOXIDE CAPTURE USING MAGNETIC HEATING

(71) Applicant: Saudi Arabian Oil Company, Dhahran (SA)

(72) Inventor: Shiv Shankar Sangaru, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 18/976,755

(22) Filed: Dec. 11, 2024

(51) Int. Cl.
| | |
|---|---|
| *B01D 53/02* | (2006.01) |
| *B01D 53/14* | (2006.01) |
| *B01D 53/48* | (2006.01) |
| *B01D 53/62* | (2006.01) |

(52) U.S. Cl.
CPC ..... *B01D 53/1475* (2013.01); *B01D 53/1425* (2013.01); *B01D 53/1493* (2013.01); *B01D 53/48* (2013.01); *B01D 53/62* (2013.01); *B01D 2252/204* (2013.01); *B01D 2252/60* (2013.01); *B01D 2257/30* (2013.01); *B01D 2257/504* (2013.01); *B01D 2259/814* (2013.01)

(58) Field of Classification Search
CPC ........... B01D 53/1475; B01D 53/1425; B01D 53/1493; B01D 53/48; B01D 53/62; B01D 2252/204; B01D 2252/60; B01D 2257/30; B01D 2257/504; B01D 2259/814
See application file for complete search history.

(56) References Cited

U.S. PATENT DOCUMENTS

| | | | |
|---|---|---|---|
| 9,175,591 | B2 | 11/2015 | Hamad |
| 12,179,158 | B1 | 12/2024 | Solovyeva et al. |
| 2002/0189445 | A1 | 12/2002 | Miller |
| 2016/0279561 | A1 | 9/2016 | Burgers |
| 2018/0243711 | A1 | 8/2018 | Mortensen et al. |
| 2018/0268972 | A1* | 9/2018 | Hesampour ........... C08F 292/00 |
| 2020/0282379 | A1* | 9/2020 | Mulet ................ B01J 20/28011 |
| 2021/0331122 | A1 | 10/2021 | Li-Oakey et al. |

(Continued)

FOREIGN PATENT DOCUMENTS

| | | |
|---|---|---|
| AU | 2013353326 | 7/2017 |
| EP | 3474947 B1 | 10/2021 |
| WO | WO 2017186608 A1 | 11/2017 |

OTHER PUBLICATIONS

Allan et al., "Energy Transition: Optimizing Existing E&P Value and Clean Energy Potential," Presented at the SPE Annual Technical Conference and Exhibition, Dubai, UAE, Sep. 2021, 17 pages.

(Continued)

*Primary Examiner* — Christopher P Jones
(74) *Attorney, Agent, or Firm* — Fish & Richardson P.C.

(57) ABSTRACT

A carbon dioxide ($CO_2$) stream reacts with an amine-modified magnetic nanoparticle in solution to form an amine-$CO_2$ adduct. The solution that includes the amine-modified magnetic nanoparticle is heated by an external alternating magnetic field. The heat provided by the external alternating magnetic field is localized such that only the amine-$CO_2$ adduct is heated to release the $CO_2$, without heating the entire solution. This process helps with the capture and release of $CO_2$ with a significantly reduced energy during the $CO_2$ release step.

20 Claims, 4 Drawing Sheets

(56) References Cited

U.S. PATENT DOCUMENTS

| | | | |
|---|---|---|---|
| 2022/0134307 A1* | 5/2022 | Sadiq | C09D 7/60 |
| | | | 95/108 |
| 2022/0145008 A1 | 5/2022 | Yang | |
| 2023/0160293 A1 | 5/2023 | Nguyen | |
| 2023/0302399 A1* | 9/2023 | Karousos | B01D 53/1425 |
| 2023/0398515 A1* | 12/2023 | Konstas | B01J 20/28057 |
| 2024/0066461 A1* | 2/2024 | Kumar | B01D 53/00 |

OTHER PUBLICATIONS

Azhari et al., "Methanol synthesis from $CO_2$: A mechanistic overview," Results in Engineering, Dec. 2022, 16(100711):1-19, 19 pages.

Bahmanpour et al., "Recent progress in syngas production via catalytic $CO_2$ hydrogenation reaction," Applied Catalysis B: Environmental, Oct. 15, 2021, 295(120319):1-11, 11 pages.

Cao et al., "Reactive Transport Modeling of Anthropogenic Carbon Mineralization in Stacked Columbia River Basalt Reservoirs," Presented at the SPE/AAPG/SEG Unconventional Resources Technology Conference, Denver, Colorado, USA, Jun. 2023, 8 pages.

Chan et al., "$CO_2$ Removal from Natural Gas Using Membrane Contactor," Prepared for presentation at the Offshore Technology Conference Asia held in Kuala Lumpur, Malaysia, Mar. 25-28, 2014, 7 pages.

Huang et al., "Enhancing hydrogen evolution reaction of confined monodispersed NiSe2—X nanoparticles by high-frequency alternating magnetic fields," Chemical Engineering Journal, 2023, 454:140279, 8 pages.

iea.blob.core.windows.net [online], "Emissions from Oil and Gas Operations in Net Zero Transitions—A World Energy Outlook Special Report on the Oil and Gas Industry and COP28," Jun. 2023, retrieved on May 20, 2024, retrieved from URL <https://iea.blob.core.windows.net/assets/2f65984e-73ee-40ba-a4d5-bb2e2c94cecb/EmissionsfromOilandGasOperationinNetZeroTransitions.pdf>, 33 pages.

Jiang et al., "Mixed-Matrix Membranes with Covalent Triazine Framework Fillers in Polymers of Intrinsic Microporosity for CO2 Separations," Ind. Eng. Chem. Res., Oct. 31, 2019, 59(12):5296-5306, 11 pages.

Liang et al., "Green synthesis of graphite from $CO_2$ without graphitization process of amorphous carbon," Nature Communications, Jan. 5, 2021, 12(119):1-9, 9 pages.

Liu et al., "Origin and evolution of a $CO_2$-Rich gas reservoir offshore Angola: Insights from the Gas Composition and isotope analysis," Applied Geochemistry, Jan. 2023, 148(105552):1-10, 10 pages.

Middleton et al., "$CO_2$ as a fracturing fluid: Potential for commercial-scale shale gas production and $CO_2$ sequestration," Energy Procedia, 2014, 63:7780-7784, 5 pages.

Muller et al., "Sabatier-based $CO_2$-methanation by catalytic conversion," Environmental Earth Science, Jul. 6, 2013, 70:3771-3778, 8 pages.

Nasr-El-Din et al., "Stimulation of Deep Gas Wells Using HCl/Formic Acid System: Lab Studies and Field Application," Presented at the Canadian International Petroleum Conference, Calgary, Alberta, Jun. 11, 2002, 22 pages.

Nwaoha et al., Heat duty, heat of absorption, sensible heat and heat of vaporization of 2-Amino-2-Methyl-1-Propanol (AMP), Piperazine (PZ) and Monoethanolamine (MEA) tri-solvent blend for carbon dioxide (CO2) capture, Chemical Engineering Science, Mar. 2017, 170:26-35, 10 pages.

Oddo et al., "Amino-functionalized magnetic nanoparticles for CO2 capture," International Journal of Smart Nano Materials, Oct. 2021, 12(4):472-490, 20 pages.

Shan et al., "Mixed-matrix membranes containing an azine-linked covalent organic framework: Influence of the polymeric matrix on post-combustion $CO_2$-capture," Journal of Membrane Science, Mar. 1, 2018, 549:377-384, 8 pages.

Snæbjörnsdóttir et al., "Carbon dioxide storage through mineral carbonation," Nature Reviews Earth & Environment, Jan. 20, 2020, 1:90-102, 13 pages.

Torres et al., "Comparative analysis of absorption, membrane, and hybrid technologies for $CO_2$ recovery," Journal of Natural Gas Science and Engineering, Oct. 2021, 94(104082):1-8, 8 pages.

Wang et al., "Enhanced Separation Performance for $CO_2$ Gas of Mixed-Matrix Membranes Incorporated with $TiO_2$/Graphene Oxide: Synergistic Effect of Graphene Oxide and Small $TiO_2$ Particles on Gas Permeability of Membranes," Ind. Eng. Chem. Res., Jul. 23, 2017, 56(31):8981-8990, 10 pages.

Wang et al., "Research Progress on Magnetic Catalysts and Its Application in Hydrogen Production Area," Energies, Jul. 2022, 15:5327, 22 pages.

Xing et al., "Iron-based magnetic nanoparticles for multimodal hyperthermia heating," Journal of Alloys and Compounds, Mar. 2021, 871:159475, 6 pages.

Zarei et al., "High performance CO2 absorption/desorption using amine-functionalized magnetic nanoparticles," Separation and Purification Technology, Oct. 2023, 323:124438, 26 pages.

* cited by examiner

CARBON DIOXIDE CAPTURE USING MAGNETIC HEATING

TECHNICAL FIELD

This disclosure relates to methods of capturing $CO_2$ from oil and gas facilities.

BACKGROUND

Carbon dioxide ($CO_2$) emission is one of the primary reasons for global warming. Carbon capture and storage is the most effective method to reduce $CO_2$ emissions. Among carbon capture technologies, the amine solvent-based capture process is one of the most mature technologies. Amine solvent-based carbon capture is widely used at acid gas removal units and in natural gas treatment plants. However, the amine solvent-based process has a high energy consumption. Specifically, the energy penalty for this technology is about 23-30% of the energy output of a power plant. The amine solvent-based process can account for 70-80% of the entire operating cost of a $CO_2$ capture plant. Further, the solvents used in the process cause equipment corrosion and loss of chemicals due to volatilization and degradation.

SUMMARY

The present disclosure provides a method for capturing carbon from a gas stream. In some implementations, the method includes dissolving an amine-modified magnetic nanoparticle in a polar or a non-polar solvent to form a solution that includes the amine-modified magnetic nanoparticle; introducing a carbon dioxide ($CO_2$) gas stream into the solution, where the $CO_2$ is absorbed by the amine-modified magnetic nanoparticle, thereby forming an amine-$CO_2$ adduct in the solution; heating the solution with an external alternating magnetic field; and desorbing $CO_2$ from the amine-$CO_2$ adduct.

In some implementations, the amine-modified nanoparticle includes a metal oxide or a metal alloy, where the metal oxide or the metal alloy includes iron oxide, manganese ferrite, oxides of nickel, oxide of cobalt, iron-platinum alloy, zinc ferrite, copper ferrite, cobalt ferrite, nickel ferrite, or combinations of them.

In some implementations, the amine-modified magnetic nanoparticle is modified with a primary amine, a secondary amine, a tertiary amine, or combinations of them.

In some implementations, the heating includes a local temperature rise of only the amine-modified magnetic nanoparticle.

In some implementations, the amine-modified magnetic nanoparticle is heated to 80-120° C.

In some implementations, the absorbing and desorbing of $CO_2$ occurs only at the surface of the amine-modified magnetic nanoparticle.

In some implementations, the $CO_2$ is obtained from a mixture of gases from a tail gas treatment unit in an oil and gas facility.

In some implementations, the mixture of gases is treated to remove sulfur-containing gases.

In some implementations, the polar or non-polar solvent includes water or non-amine based solvents.

Implementations described here provide a system for $CO_2$ capture and desorption. In some implementations, the system includes a tail gas treatment unit for removing sulfur-containing gases, where the tail gas treatment unit includes a mixture of gases that includes $CO_2$; an outlet pipe downstream of the tail gas treatment unit that flows only $CO_2$; a vessel downstream of the outlet pipe configured to receive $CO_2$ from the outlet pipe, where the vessel includes an amine-modified magnetic nanoparticle solution; and an external alternating magnet configured to heat the amine-modified magnetic nanoparticle solution in the vessel.

In some implementations, the amine-modified magnetic nanoparticle solution in the vessel reacts with the $CO_2$ from the outlet pipe to form an amine-$CO_2$ adduct.

In some implementations, the external alternating magnet is configured to heat the amine-modified magnetic nanoparticle to release $CO_2$ from the amine-$CO_2$ adduct.

In some implementations, the amine-modified magnetic nanoparticle solution includes a metal oxide or a metal alloy.

In some implementations, the amine-modified magnetic nanoparticle solution includes an amine functional group grafted on the surface of the metal oxide or the metal alloy.

In some implementations, the amine functional group includes a primary amine, a secondary amine, or a tertiary amine.

In some implementations, the amine functional group includes aminopropyltriethoxy silane (APTES), aminocaproic acid, linear or branched polyethyleneimine, diethylenetriamine, triethylenetetramine, trimethoxysilylpropyl modified (polyethylenimine), or a combination of them.

Implementations described here provide a method for $CO_2$ capture and release by a magnetic nanoparticle. In some implementations, the method includes grafting an amine functional group on the surface of the magnetic nanoparticle to form an amine-modified magnetic nanoparticle; dissolving the amine-modified magnetic nanoparticle in a polar or non-polar solvent to form a solution; introducing $CO_2$ to the solution to form an amine-$CO_2$ adduct on the amine-modified magnetic nanoparticle; and heating by an external magnetic field the amine-modified magnetic nanoparticle to release the $CO_2$ from the amine-$CO_2$ adduct.

In some implementations, the amine functional group includes aminopropyltriethoxy silane (APTES), aminocaproic acid, linear or branched polyethyleneimine, diethylenetriamine, triethylenetetramine, trimethoxysilylpropyl modified (polyethylenimine), or a combination of them.

In some implementations, the solvent includes water or a non-amine based solvent.

In some implementations, heating by the external magnetic field includes heating the amine-$CO_2$ adduct.

DETAILED DESCRIPTION

Figure 1A:
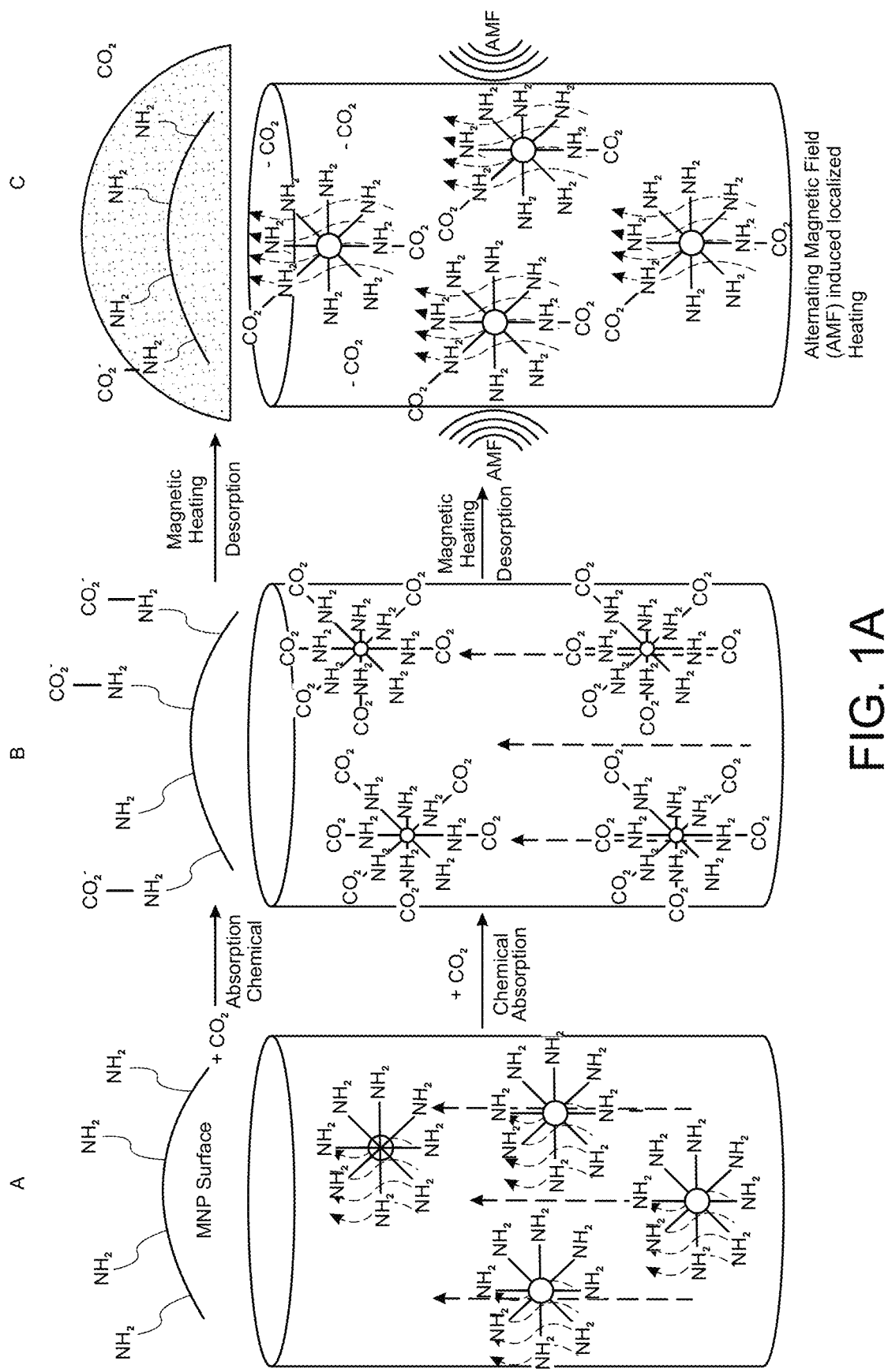
FIG. 1A is a schematic drawing of $CO_2$ capture and release by magnetic heating.

The present disclosure provides a method to capture and release $CO_2$ from a natural gas stream using an amine-modified magnetic nanoparticle. The implementations in the disclosure use a magnetic nanoparticle. For example, the magnetic nanoparticle can include iron oxide ($Fe_3O_4$), manganese ferrite ($MnFe_2O_4$), nickel, cobalt, or iron-platinum alloy (FePt). An amine functional group is grafted on the magnetic nanoparticle, such that the amine functional group is exposed at the surface of the magnetic nanoparticle. This results in an amine-modified magnetic nanoparticle which is dissolved in a solvent to form an amine-modified magnetic nanoparticle solution.

In implementations described herein, a stream of natural gas that includes $CO_2$ is introduced into the amine-modified magnetic nanoparticle solution. In some implementations, the $CO_2$ interacts with the amine groups exposed at the surface of the magnetic nanoparticle to form an amine-$CO_2$ adduct by chemical absorption. An external alternating magnetic field is applied to heat the amine-modified magnetic nanoparticle. By magnetic heating, heat is generated in the vicinity of the amine-modified magnetic nanoparticle which raises the local temperature. This temperature rise induces a temperature activated reaction to release the $CO_2$ molecule, also known as $CO_2$ desorption, without heating the entire solution. This saves significant energy in the $CO_2$ desorption step in comparison to the amine scrubbing process.

In oil and gas facilities, $CO_2$ is captured using an amine scrubbing process. The amine scrubbing process uses mono-ethanolamine (MEA) solution (20-30 wt % in water). In an amine scrubbing process $CO_2$ is mixed with MEA at its feed temperature. During this step, the $CO_2$ molecules forms a carbamate adduct with the amine group, leading to its chemical absorption. After the absorption process, the $CO_2$ rich MEA solution is heated to a temperature range of 100-140° C. to release the $CO_2$ molecules from the carbamate adduct.

The energy required to release the $CO_2$ molecules from the carbamate adduct is described by the following equation Eq.1 as:

$$Q_{reg} = \Delta H_{des} + Q_{sen} + Q_{vap} \quad (Eq. 1)$$

where $Q_{reg}$ is the energy required to release or regenerate the $CO_2$ attached to the adduct, $\Delta H_{des}$ is the heat of desorption i.e., the energy required to breakdown the species formed during chemical absorption.

$Q_{sen}$ is the sensible heat i.e., the energy required to raise the temperature of the $CO_2$ saturated solution to the desorption temperature, and $Q_{vap}$ is the heat of vaporization i.e., the energy required to vaporize the water in the $CO_2$ saturated solution for $CO_2$ removal.

The term $Q_{sen}$ i.e., sensible heat, forms a major component of the heat required for $CO_2$ release and could constitute more than 60% of the total energy for an amine scrubbing process. The sensible heat is a thermodynamic requirement to supply the necessary heat to increase the temperature of the entire $CO_2$ saturated solution to the desorption temperature. The sensible heat cannot be reduced by any process optimization. The present disclosure provides a method through magnetic heating to significantly reduce the energy requirement for the release of $CO_2$ molecules from the carbamate adduct. The following description and figures provide details of the method and system for $CO_2$ capture and release using magnetic heating.

FIG. 1A is a schematic drawing of $CO_2$ capture and release by magnetic heating.

At step A, amine functional groups are grafted on the surface of a magnetic nanoparticle. Examples of magnetic nanoparticles include, but are not limited to, iron oxide ($Fe_3O_4$), manganese ferrite ($MnFe_2O_4$), nickel, cobalt, and iron-platinum alloy (FePt). Magnetic nanoparticles have a high surface energy due to the high surface-to-volume ratios. These particles tend to aggregate to minimize the surface energy. This aggregation can alter the adsorption capacity and efficiency. To increase the adsorption capacity, the magnetic nanoparticles are surface coated. Surface coating includes the use of organic materials, surfactants, silica, metals, non-metals, metal oxides, metal sulfides, or polymers. Surface coating can prevent aggregation and can accommodate surface functionalization. Additionally, to prevent aggregation smaller dimension magnetic nanoparticles are selected.

In some implementations, primary amines, secondary amines, or tertiary amines with suitable chemistries are used to modify the magnetic nanoparticle, such that the amine functional groups are exposed at the surface. In some implementations, amine functionalized magnetic nanoparticles are prepared in a single step. In some implementations, amine functionalized magnetic nanoparticles are prepared by first preparing the magnetic nanoparticles followed by their surface modification with a suitable amine functionalized molecule. For example, the magnetic nanoparticles, such as of iron oxide can be synthesized by the co-precipitation method, hydrothermal method, or solvothermal method. In the co-precipitation method, iron Fe(II) and Fe(III) salts are dissolved in aqueous solutions followed by the addition of ammonium hydroxide leading to the synthesis of $Fe_3O_4$ nanoparticles. In some implementations, the purified magnetic nanoparticles are further directly modified with a molecule with an amine functional group or can be first coated with an intermediate layer of silica followed by modification with an amine functional group. Examples of amine functional groups include, but are not limited to, aminopropyltriethoxy silane (APTES), aminocaproic acid, linear or branched polyethyleneimine, diethylenetriamine, triethylenetetramine, and trimethoxysilylpropyl modified (polyethylenimine). In some implementations, the amine functional group is APTES. In some implementations, APTES is chemically grafted on to $Fe_3O_4$ nanoparticles. Other magnetic nanoparticles of spinel ferrites, such as, cobalt ferrite ($CoFe_2O_4$), $MnFe_2O_4$, copper ferrite ($CuFe_2O_4$), zinc ferrite ($ZnFe_2O_4$), and nickel ferrite ($NiFe_2O_4$) can also be used.

At step B, a natural gas stream that includes $CO_2$ is introduced into the amine-modified magnetic nanoparticle solution. In some implementations, a pure $CO_2$ stream is introduced into the amine-modified magnetic nanoparticle solution. The $CO_2$ molecules interact with the amine functional groups on the magnetic nanoparticles and are chemically absorbed. The absorption process leads to the formation of a carbamate adduct. In this disclosure, it is alternatively referred to as an amine-$CO_2$ adduct. The absorption of $CO_2$ on the amine-modified magnetic nanoparticle in solution can be studied by thermogravimetric analysis (TGA) or differential thermal analysis (DTA).

At step C, an external alternating magnetic field is applied to provide heat to the amine-modified magnetic nanoparticle solution. The heating effect of a magnetic nanoparticle increases as a function of frequency and magnetic field amplitude. To generate adequate heat, an optimum frequency and magnetic field amplitude is required. For example, the applied frequency of the magnetic field can range between 100-1000 kHz. Example magnetic field amplitudes can range between 10-100 kA m$^{-1}$.

During the application of the external alternating magnetic field, heat is generated only in the vicinity of the amine-modified magnetic nanoparticle, thereby raising the temperature locally. The external alternating magnetic field raises the temperature to a range of 80-120° C. In some implementations, this temperature rise is sufficient for the molecules present on the surface of the amine-modified magnetic nanoparticle to undergo a temperature activated reaction. The amine-$CO_2$ adduct undergoes a temperature activation reaction to release the $CO_2$ molecules from the adduct.

The use of an external alternating magnetic field selectively heats only the amine-modified magnetic nanoparticle, thereby eliminating the need to heat the entire solution that does not participate in the reaction. This local heating by an external alternating magnetic field significantly reduces the energy required to release $CO_2$ molecules. The energy reduction achieved using an external alternating magnetic field is about 80-90% when compared to an amine scrubbing process. Typically, energy reduction is not feasible by process optimization in an amine scrubbing process.

Figure 1B:
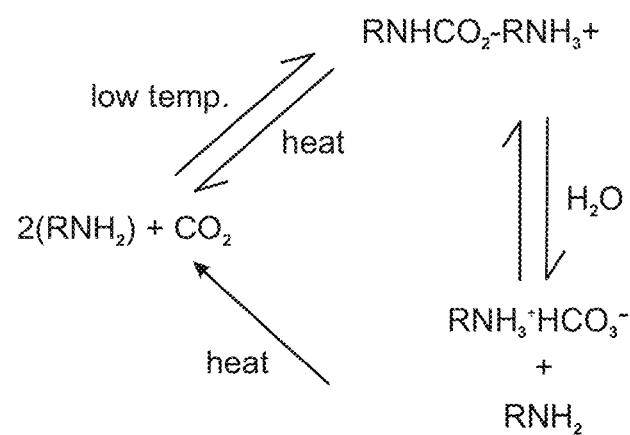
FIG. 1B shows the chemical reaction involved in the formation of an amine-$CO_2$ adduct.

FIG. 1B shows the chemical reactions involved in the formation of an amine-$CO_2$ adduct. A $CO_2$ gas stream interacts with an amine group to form an amine carbamate complex at low temperature. The amine carbamate complex is in an equilibrium reaction with an amine bicarbonate. As the carbamate is heated, $CO_2$ and amine are formed. This reaction releases the $CO_2$ molecule from the amine-$CO_2$ adduct.

Figure 2:
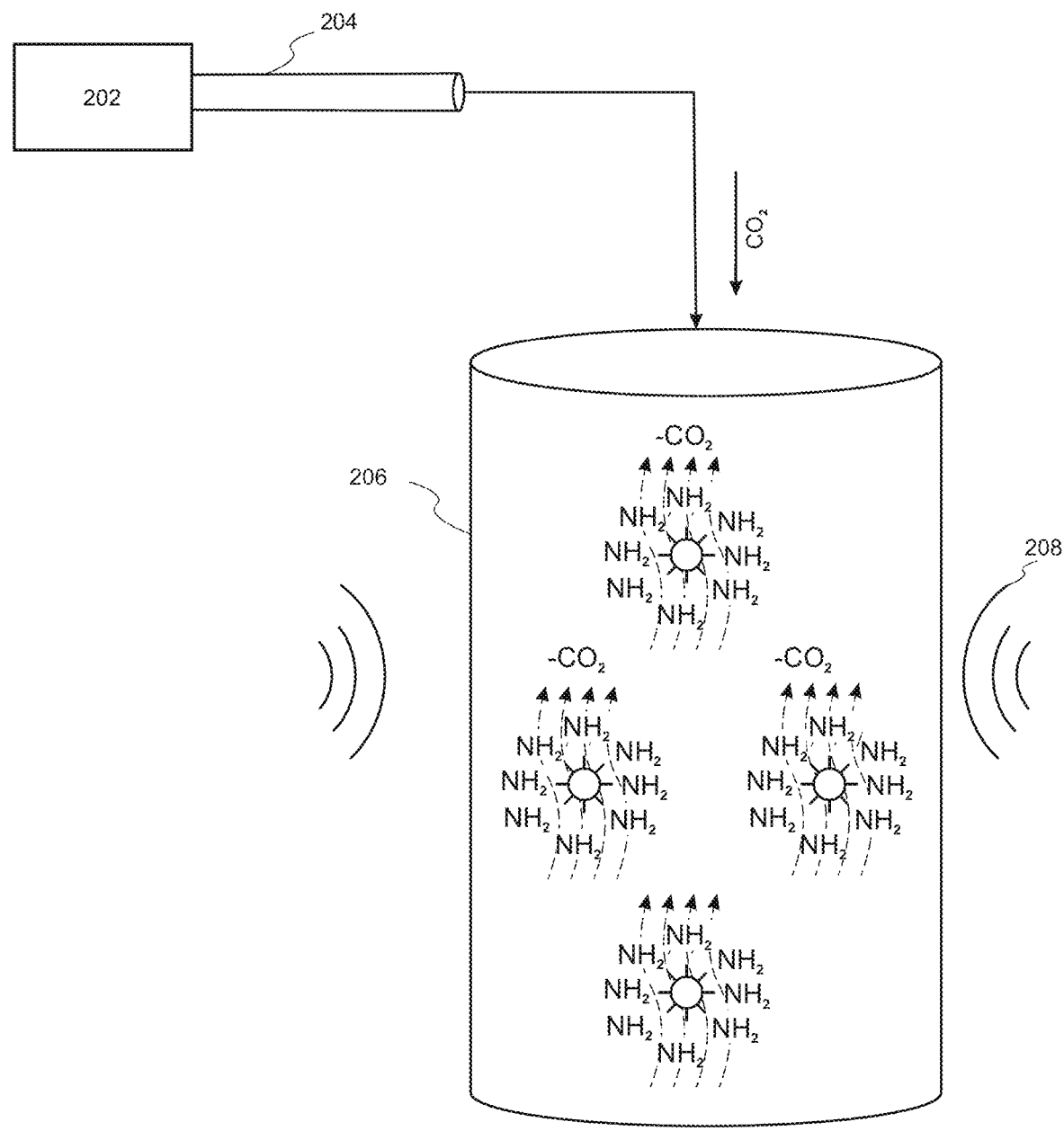
FIG. 2 is a schematic diagram of an exemplary process for $CO_2$ capture and release from a tail gas treatment unit.

FIG. 2 is a schematic diagram of an exemplary process for $CO_2$ capture and release from a tail gas treatment unit.

In some implementations, a tail gas treatment unit 202 processes acid gas streams to remove sulfur-containing gases. Acid gas streams include hydrogen sulfide ($H_2S$), sulfur dioxide ($SO_2$), $CO_2$, ammonia, and volatile organic compounds (VOCs). The tail gas treatment unit 202 includes a catalytic reactor for hydrogenation or hydrolysis process. The catalytic reactor converts all sulfur-containing gases to $H_2S$. The excess water from the catalytic reaction is removed using a quenching tower.

In some implementations, the gases leaving the quenching tower include a mixture of $H_2S$, $H_2$, and $CO_2$. The $H_2S$ is selectively removed by absorption and recycled back to the catalytic reactor. In some implementations, $H_2$ and $CO_2$ are processed by a $H_2$ selective membrane and $CO_2$ selective membrane, respectively. The $CO_2$ gas stream which passes through the $CO_2$ selective membrane has ~97% purity. The $CO_2$ gas stream from the $CO_2$ selective membrane flows through an outlet pipe 204 downstream of the tail gas treatment unit 202.

In some implementations, the $CO_2$ gas stream from the outlet pipe 204 flows into a vessel 206. The vessel 206 is fluidically coupled to the outlet pipe 204. The vessel includes an amine-modified magnetic nanoparticle solution. The $CO_2$ which flows from the outlet pipe 204 reacts with the amine functional group on the amine-modified magnetic nanoparticle to form a $CO_2$-amine adduct. An external alternating magnetic field 208 is applied to the vessel 206 such that it selectively heats the amine-modified magnetic nanoparticle. The heat generated by the alternating magnetic field raises the temperature of the amine-$CO_2$ adduct. The external alternating magnetic field raises the temperature to a range of 80-120° C. This induces a temperature activation reaction that releases the $CO_2$ molecules from the amine-$CO_2$ adduct. The heat generated by the alternating magnetic field does not raise the temperature of the entire solution, but selectively provides heat only to the amine-modified magnetic nanoparticle. In some implementations, downstream units process the released $CO_2$ to produce valuable chemicals. For example, the valuable chemicals can include syngas or formic acid. In some implementations, the released $CO_2$ is stored in geological formations.

Figure 3:
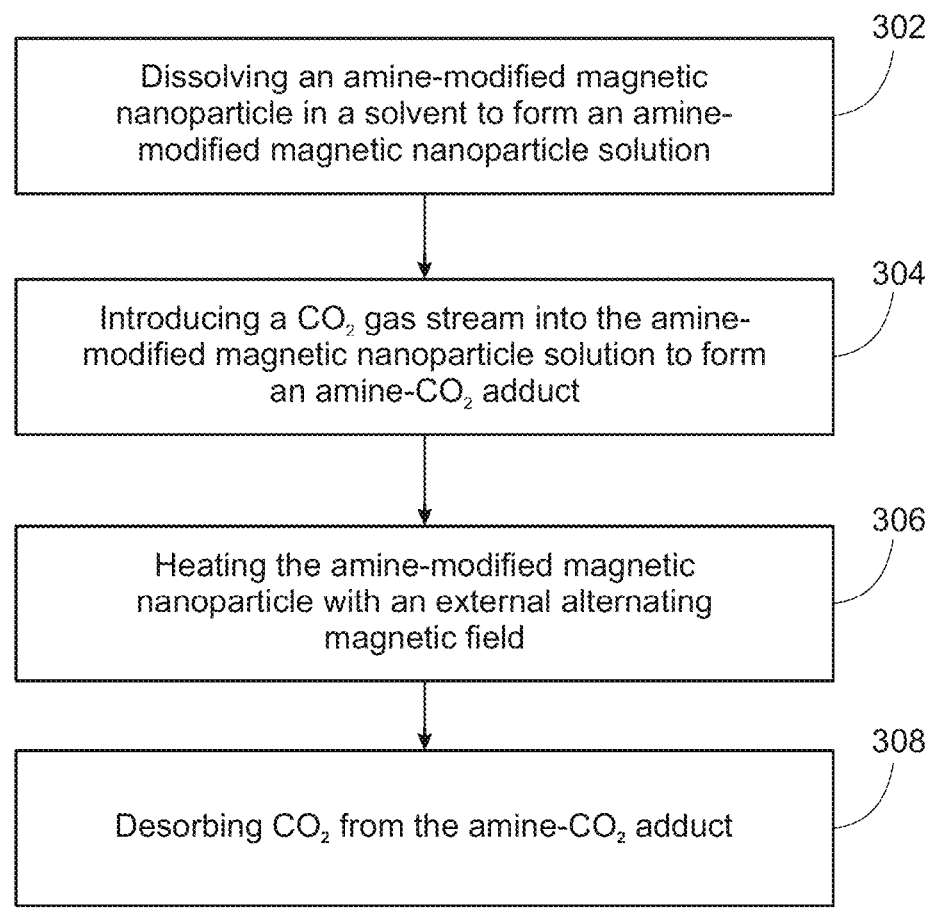
FIG. 3 is a flow diagram representing the method of $CO_2$ capture and release by magnetic heating.

FIG. 3 is a block flow diagram representing the method of $CO_2$ capture and release by magnetic heating.

At block 302, an amine functional group is dissolved in water, a polar solvent, or a non-polar solvent. The solvents do not include amine-based solvents. The amine functional group is a primary, secondary, or tertiary amine. The solvent includes magnetic nanoparticles. In some implementations, the magnetic nanoparticles include iron oxide ($Fe_3O_4$), manganese ferrite ($MnFe_2O_4$), nickel, cobalt, or iron-platinum alloy (FePt). The resulting solution is stirred for several minutes to form an amine-modified magnetic nanoparticle solution.

At block 304, a $CO_2$ gas stream is introduced into the amine-modified magnetic nanoparticle solution. In some implementations, the $CO_2$ reacts with the amine functional group to form an amine-$CO_2$ adduct.

At block 306, an external alternating magnetic field is used to selectively heat only the amine-modified magnetic nanoparticle. The external alternating magnetic field raises the temperature to a range of 80-120° C. The heat generated by this method does not heat the entire solution. The heat is generated at the amine-modified magnetic nanoparticle, which induces a temperature activated reaction at the amine-$CO_2$ adduct.

At block 308, the heat supplied to the amine-modified magnetic nanoparticle causes the $CO_2$ to desorb from the amine-$CO_2$ adduct.

An implementation described herein provides a method for $CO_2$ capture and release using magnetic heating. Amine-modified magnetic nanoparticles in solution are used to capture $CO_2$ from natural gas streams or from pure $CO_2$ gas streams from a tail gas treatment unit. The $CO_2$ reacts with the amine group to form a carbamate adduct. An external alternating magnetic field is applied to the amine-modified nanoparticle solution. The heat generated by the alternating magnetic field heats the carbamate adduct to release $CO_2$. During this process, the entire solution is not heated, but the amine-modified magnetic nanoparticle is selectively heated. It is to be understood that in the methods of the present disclosure, although the amine-modified magnetic nanoparticles are selectively heated and the entire surrounding solution is not, part of the heat energy of the heated nanoparticles will be dissipated and the surrounding solvent in the vicinity of the magnetic nanoparticle will also rise in temperature to some extent.

Other implementations are also within the scope of the following claims.

Exemplary Embodiments

1. A method of capturing carbon from a gas stream comprising:
   dissolving an amine-modified magnetic nanoparticle in a polar or a non-polar solvent to form a solution comprising the amine-modified magnetic nanoparticle;
   introducing a carbon dioxide ($CO_2$) gas stream into the solution, wherein the $CO_2$ is absorbed by the amine-modified magnetic nanoparticle, thereby forming an amine-$CO_2$ adduct in the solution;
   heating the solution with an external alternating magnetic field; and
   desorbing $CO_2$ from the amine-$CO_2$ adduct.

2. The method of embodiment 1, wherein the amine-modified nanoparticle comprises a metal oxide or a metal alloy, wherein the metal oxide or the metal alloy comprises iron oxide, manganese ferrite, oxides of nickel, oxide of cobalt, iron-platinum alloy, zinc ferrite, copper ferrite, cobalt ferrite, nickel ferrite, or combinations thereof.

3. The method of embodiment 1 or 2, wherein the amine-modified magnetic nanoparticle is modified with a primary amine, a secondary amine, a tertiary amine, or combinations thereof.

4. The method of any of embodiments 1 to 3, wherein the heating comprises a local temperature rise of only the amine-modified magnetic nanoparticle.

5. The method of any of embodiments 1 to 4, wherein the amine-modified magnetic nanoparticle is heated to 80-120° C.

6. The method of any of embodiments 1 to 5, wherein the absorbing and desorbing of $CO_2$ occurs only at the surface of the amine-modified magnetic nanoparticle.

7. The method of any of embodiments 1 to 6, wherein the $CO_2$ is obtained from a mixture of gases from a tail gas treatment unit in an oil and gas facility.

8. The method of any of embodiments 1 to 7, wherein the mixture of gases is treated to remove sulfur-containing gases.

9. The method of any of embodiments 1 to 8, wherein the polar or non-polar solvent comprises water or non-amine based solvents.

10. A system for carbon dioxide ($CO_2$) capture and desorption comprising:
   a tail gas treatment unit for removing sulfur-containing gases, wherein the tail gas treatment unit comprises a mixture of gases comprising $CO_2$;
   an outlet pipe downstream of the tail gas treatment unit that flows only $CO_2$;
   a vessel downstream of the outlet pipe configured to receive $CO_2$ from the outlet pipe, wherein the vessel comprises an amine-modified magnetic nanoparticle solution; and
   an external alternating magnet configured to heat the amine-modified magnetic nanoparticle solution in the vessel.

11. The system of embodiment 10, wherein the amine-modified magnetic nanoparticle solution in the vessel reacts with the $CO_2$ from the outlet pipe to form an amine-$CO_2$ adduct.

12. The system of embodiment 10 or 11, wherein the external alternating magnet is configured to heat the amine-modified magnetic nanoparticle to release $CO_2$ from the amine-$CO_2$ adduct.

13. The system of any of embodiments 10 to 12, wherein the amine-modified magnetic nanoparticle solution comprises a metal oxide or a metal alloy.

14. The system of any of embodiments 10 to 13, wherein the amine-modified magnetic nanoparticle solution comprises an amine functional group grafted on the surface of the metal oxide or the metal alloy.

15. The system of any of embodiments 10 to 14, wherein the amine functional group comprises a primary amine, a secondary amine, or a tertiary amine.

16. The system of any of embodiments 10 to 15, wherein the amine functional group comprises aminopropyltriethoxy silane (APTES), aminocaproic acid, linear or branched polyethyleneimine, diethylenetriamine, triethylenetetramine, trimethoxysilylpropyl modified (polyethylenimine), or a combination thereof.

17. A method for carbon dioxide ($CO_2$) capture and release by a magnetic nanoparticle comprising:
   grafting an amine functional group on the surface of the magnetic nanoparticle to form an amine-modified magnetic nanoparticle;
   dissolving the amine-modified magnetic nanoparticle in a polar or non-polar solvent to form a solution;
   introducing $CO_2$ to the solution to form an amine-$CO_2$ adduct on the amine-modified magnetic nanoparticle; and
   heating by an external magnetic field the amine-modified magnetic nanoparticle to release the $CO_2$ from the amine-$CO_2$ adduct.

18. The method of embodiment 17, wherein the amine functional group comprises aminopropyltriethoxy silane (APTES), aminocaproic acid, linear or branched polyethyleneimine, diethylenetriamine, triethylenetetramine, trimethoxysilylpropyl modified (polyethylenimine), or a combination thereof.

19. The method of embodiment 17 or 18, wherein the solvent comprises water or a non-amine based solvent.

20. The method of any of embodiments 17 to 19, wherein heating by the external magnetic field comprises heating the amine-$CO_2$ adduct.

What is claimed is:

1. A method of capturing carbon from a gas stream comprising:
   dissolving an amine-modified magnetic nanoparticle in a polar or a non-polar solvent to form a solution comprising the amine-modified magnetic nanoparticle;
   introducing a carbon dioxide ($CO_2$) gas stream into the solution, wherein the $CO_2$ is absorbed by the amine-modified magnetic nanoparticle, thereby forming an amine-$CO_2$ adduct in the solution;
   heating the solution with an external alternating magnetic field; and
   desorbing $CO_2$ from the amine-$CO_2$ adduct.

2. The method of claim 1, wherein the amine-modified nanoparticle comprises a metal oxide or a metal alloy, wherein the metal oxide or the metal alloy comprises iron oxide, manganese ferrite, oxides of nickel, oxide of cobalt, iron-platinum alloy, zinc ferrite, copper ferrite, cobalt ferrite, nickel ferrite, or combinations thereof.

3. The method of claim 1, wherein the amine-modified magnetic nanoparticle is modified with a primary amine, a secondary amine, a tertiary amine, or combinations thereof.

4. The method of claim 1, wherein the heating comprises a local temperature rise of only the amine-modified magnetic nanoparticle.

5. The method of claim 4, wherein the amine-modified magnetic nanoparticle is heated to 80-120° C.

6. The method of claim 1, wherein the absorbing and desorbing of $CO_2$ occurs only at the surface of the amine-modified magnetic nanoparticle.

7. The method of claim 1, wherein the $CO_2$ is obtained from a mixture of gases from a tail gas treatment unit in an oil and gas facility.

8. The method of claim 7, wherein the mixture of gases is treated to remove sulfur-containing gases.

9. The method of claim 1, wherein the polar or non-polar solvent comprises water or non-amine based solvents.

10. A system for carbon dioxide ($CO_2$) capture and desorption comprising:
   a tail gas treatment unit for removing sulfur-containing gases, wherein the tail gas treatment unit comprises a mixture of gases comprising $CO_2$;
   an outlet pipe downstream of the tail gas treatment unit that flows only $CO_2$;
   a vessel downstream of the outlet pipe configured to receive $CO_2$ from the outlet pipe, wherein the vessel comprises an amine-modified magnetic nanoparticle solution; and an external alternating magnet configured to heat the amine-modified magnetic nanoparticle solution in the vessel.

11. The system of claim 10, wherein the amine-modified magnetic nanoparticle solution in the vessel reacts with the $CO_2$ from the outlet pipe to form an amine-$CO_2$ adduct.

12. The system of claim 11, wherein the external alternating magnet is configured to heat the amine-modified magnetic nanoparticle to release $CO_2$ from the amine-$CO_2$ adduct.

13. The system of claim 10, wherein the amine-modified magnetic nanoparticle solution comprises a metal oxide or a metal alloy.

14. The system of claim 13, wherein the amine-modified magnetic nanoparticle solution comprises an amine functional group grafted on the surface of the metal oxide or the metal alloy.

15. The system of claim 14, wherein the amine functional group comprises a primary amine, a secondary amine, or a tertiary amine.

16. The system of claim 15, wherein the amine functional group comprises aminopropyltriethoxy silane (APTES), aminocaproic acid, linear or branched polyethyleneimine, diethylenetriamine, triethylenetetramine, trimethoxysilylpropyl modified (polyethylenimine), or a combination thereof.

17. A method for carbon dioxide ($CO_2$) capture and release by a magnetic nanoparticle comprising:
grafting an amine functional group on the surface of the magnetic nanoparticle to form an amine-modified magnetic nanoparticle;
dissolving the amine-modified magnetic nanoparticle in a polar or non-polar solvent to form a solution;
introducing $CO_2$ to the solution to form an amine-$CO_2$ adduct on the amine-modified magnetic nanoparticle; and
heating by an external magnetic field the amine-modified magnetic nanoparticle to release the $CO_2$ from the amine-$CO_2$ adduct.

18. The method of claim 17, wherein the amine functional group comprises aminopropyltriethoxy silane (APTES), aminocaproic acid, linear or branched polyethyleneimine, diethylenetriamine, triethylenetetramine, trimethoxysilylpropyl modified (polyethylenimine), or a combination thereof.

19. The method of claim 17, wherein the solvent comprises water or a non-amine based solvent.

20. The method of claim 17, wherein heating by the external magnetic field comprises heating the amine-$CO_2$ adduct.

* * * * *